United States Patent [19]

Yamamoto et al.

[11] Patent Number: 4,523,659
[45] Date of Patent: Jun. 18, 1985

[54] REAR SUSPENSION FOR A MOTORCYCLE

[75] Inventors: Kazuhiro Yamamoto, Saitama; Tokio Isono, Tokyo, both of Japan

[73] Assignee: Honda Giken Kogyo Kabushiki Kaisha, Tokyo, Japan

[21] Appl. No.: 497,652

[22] Filed: May 24, 1983

[30] Foreign Application Priority Data

Jun. 7, 1982 [JP] Japan ................... 57-97315

[51] Int. Cl.³ ............................................. B62K 25/04
[52] U.S. Cl. ..................................... 180/227; 280/284
[58] Field of Search ................. 180/227, 219; 280/284

[56] References Cited

U.S. PATENT DOCUMENTS

| | | | |
|---|---|---|---|
| 4,058,181 | 11/1977 | Buell | 280/284 X |
| 4,076,271 | 2/1978 | Doncque | 180/227 X |
| 4,360,214 | 11/1982 | Isono | 280/284 |
| 4,408,674 | 10/1983 | Boyesen | 280/284 X |
| 4,440,413 | 4/1984 | Miyakoshi et al. | 280/284 |

Primary Examiner—John A. Pekar
Attorney, Agent, or Firm—Lyon & Lyon

[57] ABSTRACT

A rear suspension for a motorcycle having progressive linkage for a cushion. A swing arm support linkage is defined by an arm and tension rods extending between the body frame and the rear wheel support frame. A pivotal connection on the swing arm support linkage defines progressive motion responsive to pivotal motion of the rear wheel support frame. A cushion linkage extending between the pivotal connection of the swing arm support linkage and either the body frame or rear wheel support frame provides compounded progressive motion at an attachment position for the cushion, the cushion linkage also being defined by a linkage arm and a tension rod.

13 Claims, 7 Drawing Figures

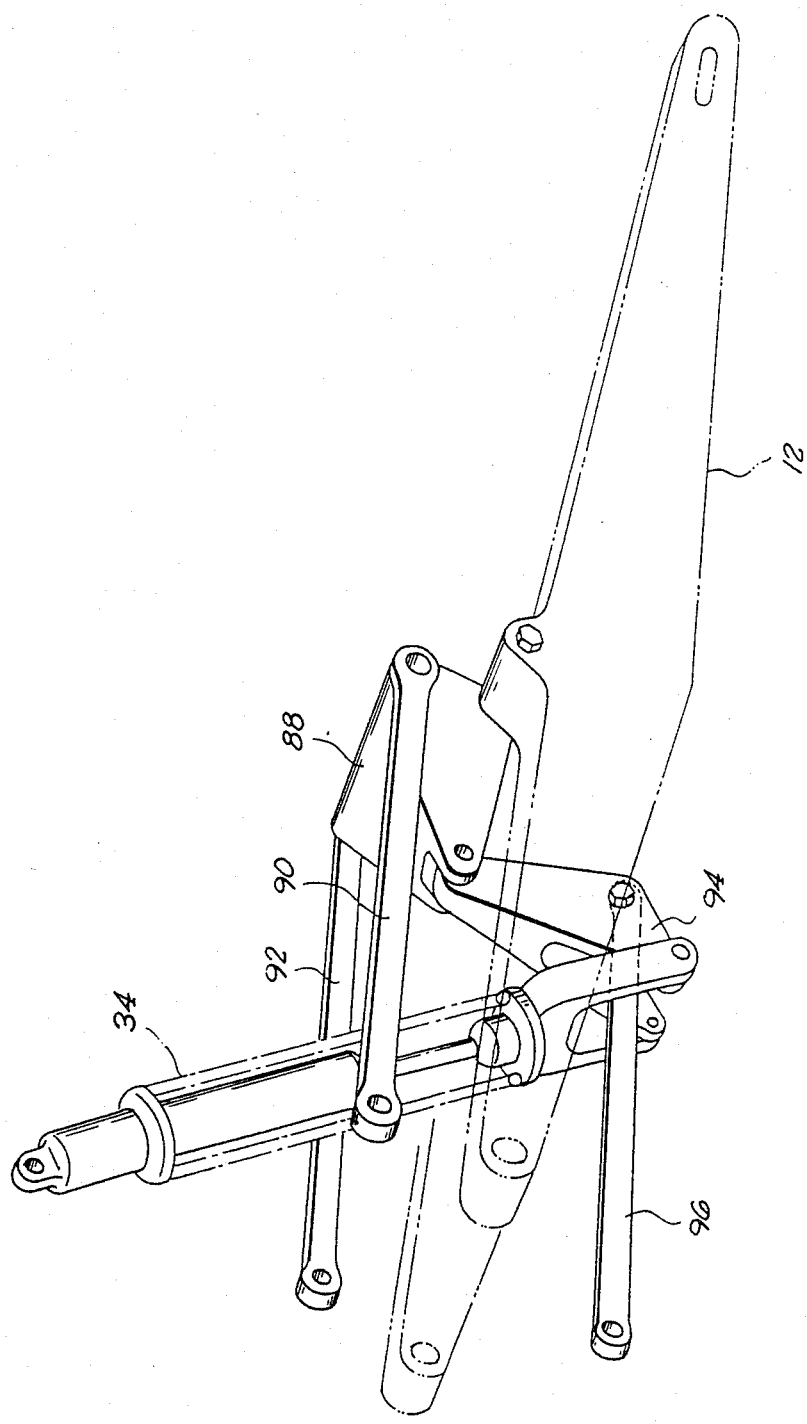

REAR SUSPENSION FOR A MOTORCYCLE

BACKGROUND OF THE INVENTION

The field of the present invention is linkage for the rear suspension of a motorcycle employing a pivotally mounted rear wheel support frame.

Motorcycles have long employed a rear suspension including a rear wheel support frame or swing arm which is pivotally mounted about a transverse horizontal axis to a body frame. One or more cushion members then extend between the body frame and either the rear wheel support frame itself or to linkage which can have varying rates of rise relative to the rear wheel support frame. In such linkage-type devices, progressive linkage has been developed which results in an increasing rate of rise relative to the rate of rise of the rear wheel support frame itself. Through the employment of such progressive link mechanisms, the damping and resistance force generated by a cushion mechanism extending between the body frame and the linkage increases with increased pivotal movement of the rear wheel support frame. Such a cushion response may then be employed which, in combination with the linkage, can give an improved ride and an improved suspension response.

In developing such a progressive linkage system for a motorcycle, many design limitations exist. A substantial factor in such limitations includes a lack of space for placement of a more advantageous cushion and linkage system. As a result, rear suspension designs have resulted in smaller cushion strokes and limited variations in stroke rate. The limited area for location of the linkage mechanism has resulted in designs exemplified by a rod and an arm pivotally connected together with one being connected to the rear wheel support frame and the other being connected to the body frame. The cushion member then extends to the arm with the rod and arm arranged to give at least limited progression in stroke ratio.

Additionally, limitations in both space and linkage design have resulted in devices exhibiting substantial forces responsive to movement of the rear suspension which are borne by the rear wheel support frame itself. Because of these forces, it has been necessary to design excessive structural rigidity and strength into the rear wheel support frame. In doing so, the effective unsprung weight is increased, having a detrimental effect on ride.

SUMMARY OF THE INVENTION

The present invention is directed to a rear suspension for a motorcycle of the progressive linkage type which provides a substantial cushion stroke, the ability to substantially increase the variations in the rate of the cushion stroke to the pivotal movement of the rear wheel support frame, and better apportionment of the loads and forces on the rear suspension such that reduced structural strength and rigidity of the rear wheel support frame can be accomodated. To this end, the linkage associated with the body frame, the rear wheel support frame and the cushion member employs a swing arm support linkage extending between the body frame and the rear wheel support frame which is capable of providing an increasing rate of rise relative to the rear wheel support frame at an attachment point thereon. A cushion linkage may then be coupled with either the body frame or the rear wheel support frame and to the swing arm support linkage to compound or further magnify the increase in the rate of rise relative to the rear wheel support frame.

The linkage further acts to distribute loads resulting from the cushion member and loads otherwise borne by the rear wheel support frame. To this end, linkage is provided which includes laterally spaced rods and broad or dual arm members. As a result, resistance to moments within the suspension system is undertaken with increased leverage. Longer bearing surfaces for the same purpose may also be employed.

Accordingly, it is a principal object of the present invention to provide an improved rear suspension having a highly advantageous progressive linkage system. Other and further objects and advantages will appear hereinafter.

BRIEF DESCRIPTION OF THE DRAWINGS

FIG. 7 is an oblique view of the embodiment of FIG. 6.

DETAILED DESCRIPTION OF THE PREFERRED EMBODIMENTS

Figure 1:
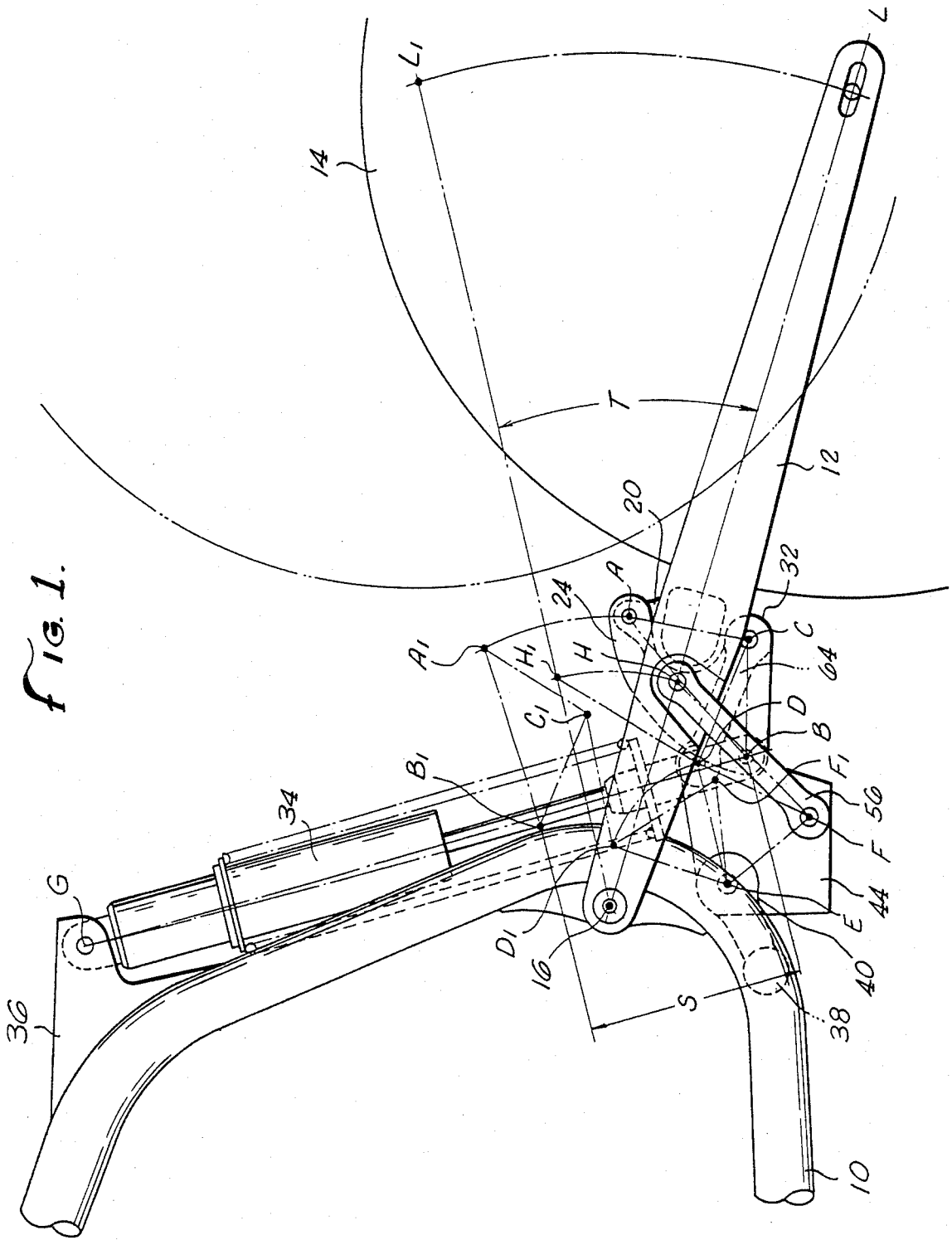
FIG. 1 is a side view of a first embodiment of the present invention.
Figure 2:
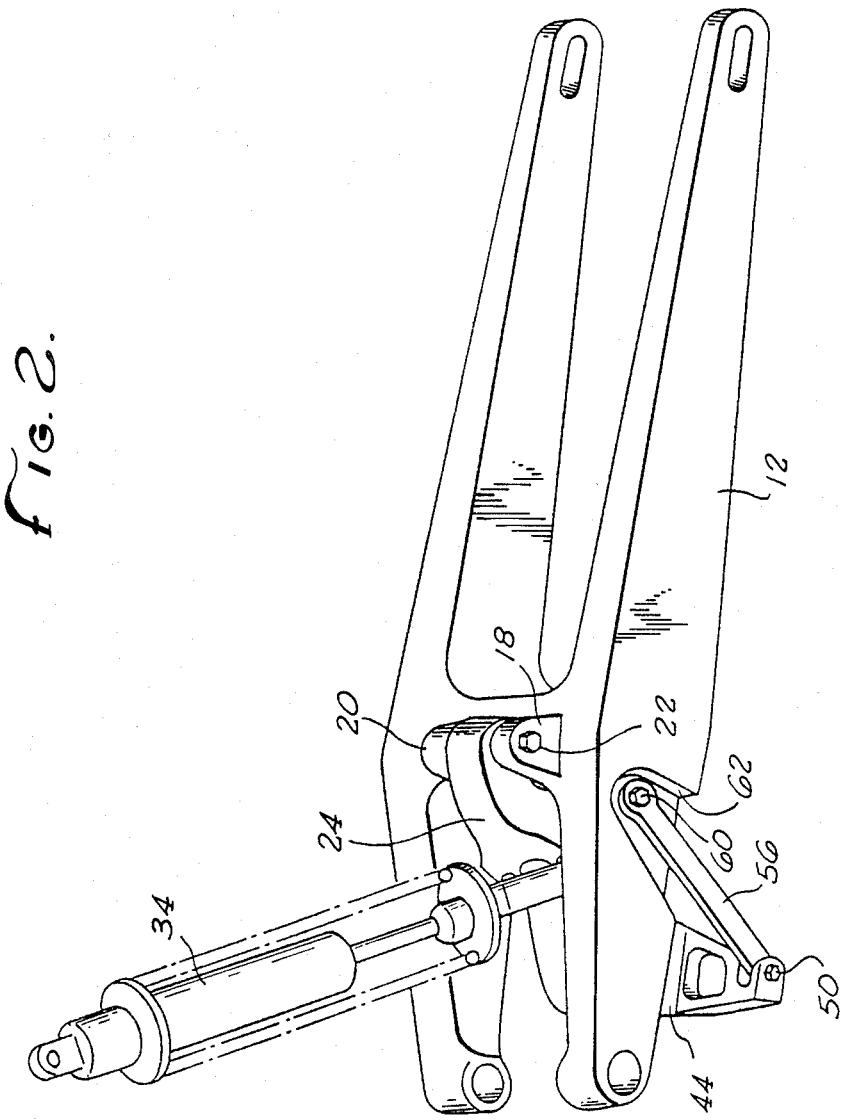
FIG. 2 is an oblique view of the first embodiment illustrating the rear suspension.
Figure 3:
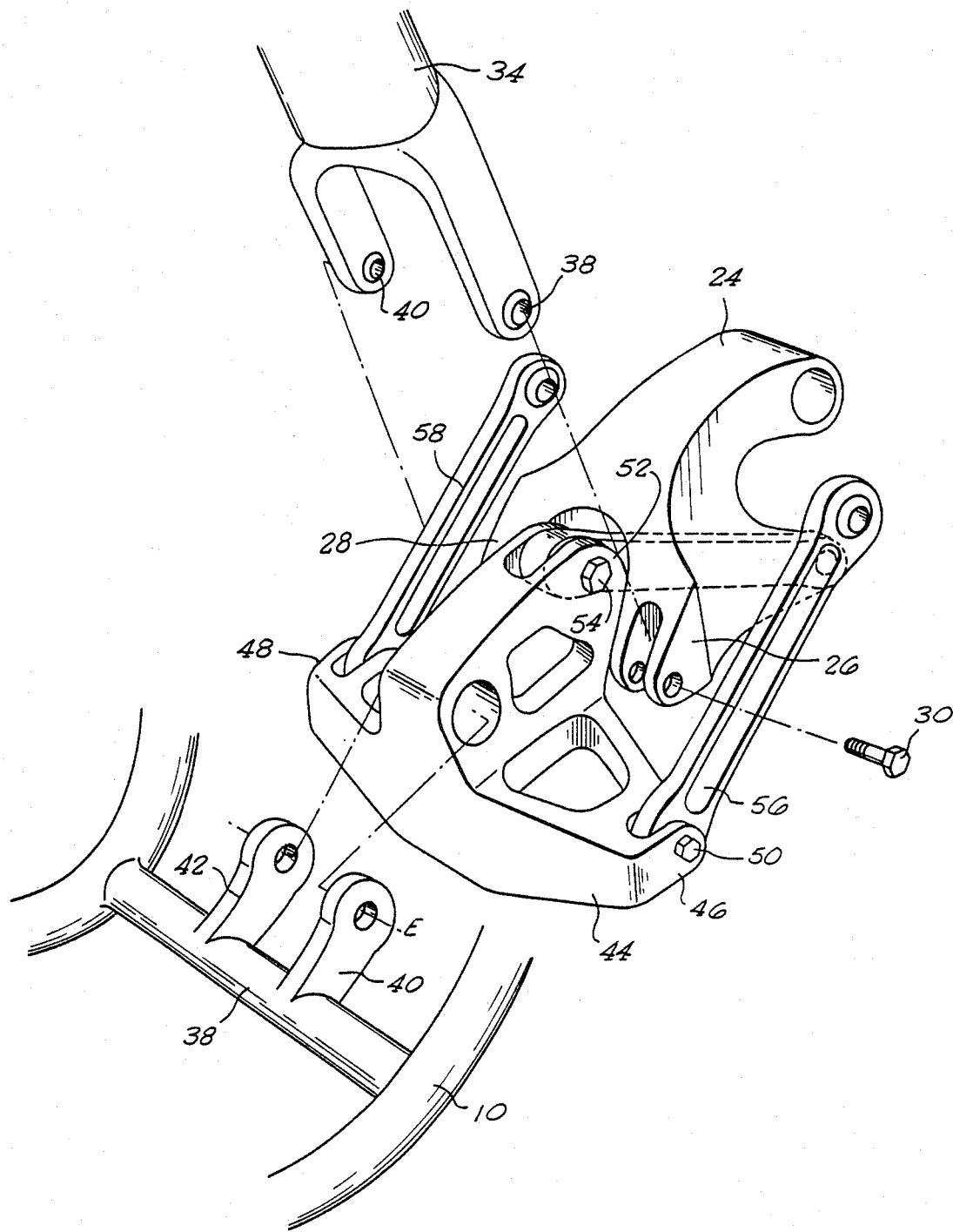
FIG. 3 is an exploded oblique view also illustrating the first embodiment of the present invention.

Turning in detail to the drawings and particularly the embodiment of FIGS. 1, 2 and 3, the rear portion of a body frame 10 of a motorcycle is illustrated having an inclined upstanding portion continuous with a horizontally extending portion forming an undercarriage and defining an included area for receipt of the engine, transmission and other equipment in a conventional manner. Pivotally mounted to the body frame 10 is a swing arm or rear wheel support frame 12 designed to rotatably mount a rear wheel 14. The rear wheel support frame 12 is pivotally mounted about a pivot shaft 16.

The rear wheel support frame 12 includes two side members with a cross member extending therebetween intermediate the ends of the side members. This structure may best be seen in FIG. 2. At the forward end of the support frame 12 are aligned transverse holes for receiving the pivot shaft 16. At the rear of the support frame 12 are transversely aligned holes for receiving the axle of the rear wheel 14.

Located on the upper side of the cross member of the support frame 12 are two brackets 18 and 20 which extend upwardly to define a mounting area therebetween. A pin or bolt 22 extends between the two brackets 18 and 20 to receive and pivotally mount an arm 24. The arm 24 extends in an approximate L-shape so as to circumvent the cross member of the rear wheel support frame 12 and at the same time provide advantageous pivotal attachment points. Thus, the arm 24 is able to pivot relative to the rear wheel support frame 12 about a transverse axis A. The transverse axis A translates to location $A_1$ as the rear wheel support frame 12 moves through angle T as may be measured by reference to centerline L.

The arm 24 extends from the transverse axis A to laterally spaced bifurcate brackets 26 and 28. The bifurcate brackets 26 and 28 employ bolts 30 to define transverse and coincident pivot axes B. The arm 24 further extends in a rearwardly direction to a bifurcate bracket 32. The bifurcate bracket 32 similarly defines a transverse pivot axis C.

A cushion 34 is shown to be pivotally mounted at a first end at G to a mounting bracket 36 which is in turn fixed to the body frame 10. The cushion 34 is most advantageously of the type employing both a spring and a damping mechanism therein. The cushion 34 extends downwardly from the bracket 36 to a second end associated with the arm 24. The second end is forked to provide two attachment holes 38 and 40 which are pivotally connected to the arm 24 at the bifurcate brackets 26 and 28. As can be seen in FIG. 1, with the rear wheel support frame 12 moving through angle T, the second end of the cushion 34 will move from the location of the axis B to $B_1$. As can be seen, this is a substantial stroke given the location of the cushion 34 and the angle T.

Approaching the linkage mechanism from its attachment location to the body frame 10, a cross pipe 38 has mounted thereon clevis lugs 40 and 42 defining a transverse axis E. The clevis lugs 40 and 42 thus define an axis E which is parallel to and spaced below the pivot axis of the rear wheel support frame 12, both the axis through the pivot shaft 16 and the axis E being fixed relative to the body frame 10.

Pivotally connected to the body frame 10 at the axis E is an arm 44. The arm 44 defines a broad bearing which may fit between the clevis lugs 40 and 42 to be pivotally mounted therebetween. The arm 24 also defines a broad bearing at axis A between the two brackets 18 and 20. The available width on both arms 24 and 44 increase the resistive moment arms to torques resulting from suspension strain. The arm 44 extends laterally from the center thereof to laterally spaced attachment points 46 and 48. The attachment points 46 and 48 define by means of bolts 50 a transverse axis F. A further, centrally located bifurcate bracket 52 extends to define a pivot axis D through a bolt 54.

To construct the swing arm support linkage extending between the body frame 10 and the rear wheel support frame 12, the arm 44 is pivotally connected at the axis F through attachment points 46 and 48 to rods 56 and 58. The rods 56 and 58 are in turn pivotally connected to the rear wheel support frame 12 at axis H. The transverse pivot axis H is defined through a bolt 60, the attachment being located within recesses 62 provided on either side of the rear wheel support frame 12. The rods 56 and 58 are laterally spaced providing a significant resistance to torquing of the rear wheel support frame 12.

A cushion linkage extending, in the embodiment of FIGS. 1—3 from the rear wheel support frame 12 to the swing arm support linkage includes the arm 24 pivotally mounted to the rear wheel support frame 12 at transverse axis A and centrally located rod 64 which extends from the transverse axis C on the arm 24 to the transverse axis D defined on the arm 44. As previously discussed, the arm 24 of the cushion linkage has the cushion 34 pivotally attached at the axis B.

In operation, the first embodiment illustrated in FIGS. 1-3 is functionally illustrated in movement through the full pivotal range of the rear wheel support frame 12, through angle T. With the movement of the rear wheel support frame 12 through the angle T, transverse axes A and H similarly move about the pivot shaft 16 through the same angle, these axes being fixed to the rear wheel support frame 12. As such, transverse axes A and C will move to locations $A_1$ and $C_1$. Naturally, the axis at E is fixed relative to the body frame 10 as is the axis at pivot shaft 16. Relative movement is thus experienced by the linkage system between these several points. The pivotal connecting points through axes D and F through the arm 44 turn counterclockwise about the pivotal connecting axis E to move to $B_1$ and $F_1$. At the same time, the triangle defined by axes A, B and C of arm 24 and the triangle defined by axes D, E and F of the arm 44 are fixed as being defined in solid components. Consequently, triangle A, B, C and $A_1$, $B_1$, $C_1$ and triangles D, E, F and $D_1$, $E_1$, $F_1$ maintain geometric congruence through their respective rotation. As a result, the axis B which is also the attachment point of the lower end of the cushion 34 moves from the position at B to the position $B_1$. This illustrates the whole compression stroke S of the cushion.

As will be readily discerned, the maximum compression stroke S is substantial in terms of the movement of the rear wheel support frame 12 adjacent the attachment point of the cushion. Furthermore, the rate of movement of the attachment point B to the rate of movement of the swing arm or rear wheel support frame 12 is not constant but increases as the swing arm moves upwardly. Both the displacement and rate are the results of the movement of the pivotal connection at transverse axis D of the swing arm support linkage combined with the movement of the cushion linkage. The stroke S allows for better cushion design while the increase in relative rate adds to improved riding comfort as well as advantageous suspension response.

Through the employment of both the swing arm support linkage and the cushion linkage in one linkage system, the shock loads, forces and moments are effectively disbursed over the body frame 10 as well as the rear wheel support frame 12. This avoids local loading, particularly to the rear wheel support frame 12 such that weight reduction may be realized.

Figure 4:
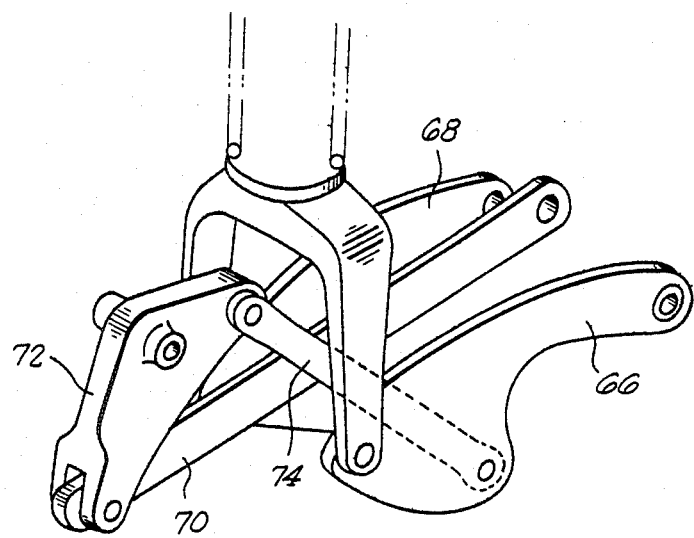
FIG. 4 is an oblique view of a second embodiment of the present invention.

Looking then to the second embodiment as illustrated in FIG. 4, alternate linkage schemes are employed to effect the same result as realized in the embodiment of FIGS. 1-3. FIG. 4 is specifically directed to linkage wherein the crank arm, arm 24 in the first embodiment, is divided into two plates 66 and 68. At the same time, a single tension rod 70, replacing the two tension rods 56 and 58 in the first embodiment, extends between the revised arm 72, corresponding to the arm 44 of the first embodiment to the rear wheel support frame (not shown). The swing arm support linkage thus defined in FIG. 4 includes the arm 72 and the rod 70. The cushion linkage includes the plates 66 and 68 coupled at one end to the rear wheel support frame and to the arm 72 through two rods 74.

Figure 5:
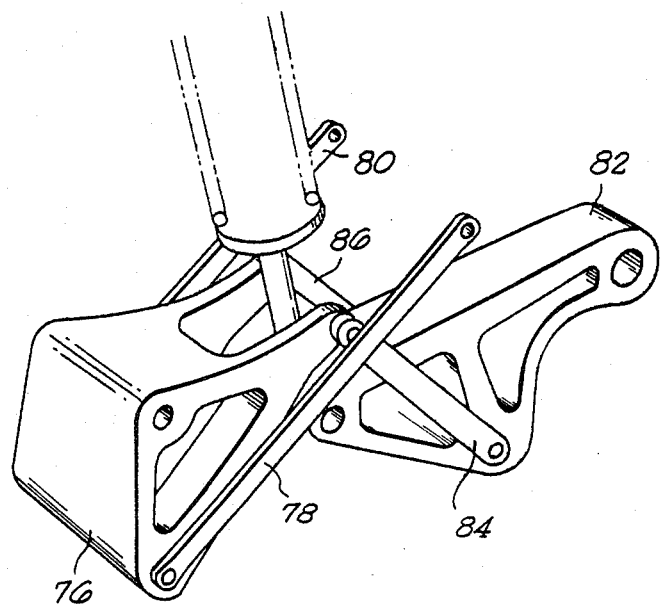
FIG. 5 is an oblique view of a third embodiment of the present invention.

FIG. 5 illustrates yet another embodiment where the swing arm support linkage includes an arm 76 and spaced rods 78 and 80. The cushion linkage includes an arm 82 and two rods 84 and 86 extending to couple with the swing arm support linkage.

Figure 6:
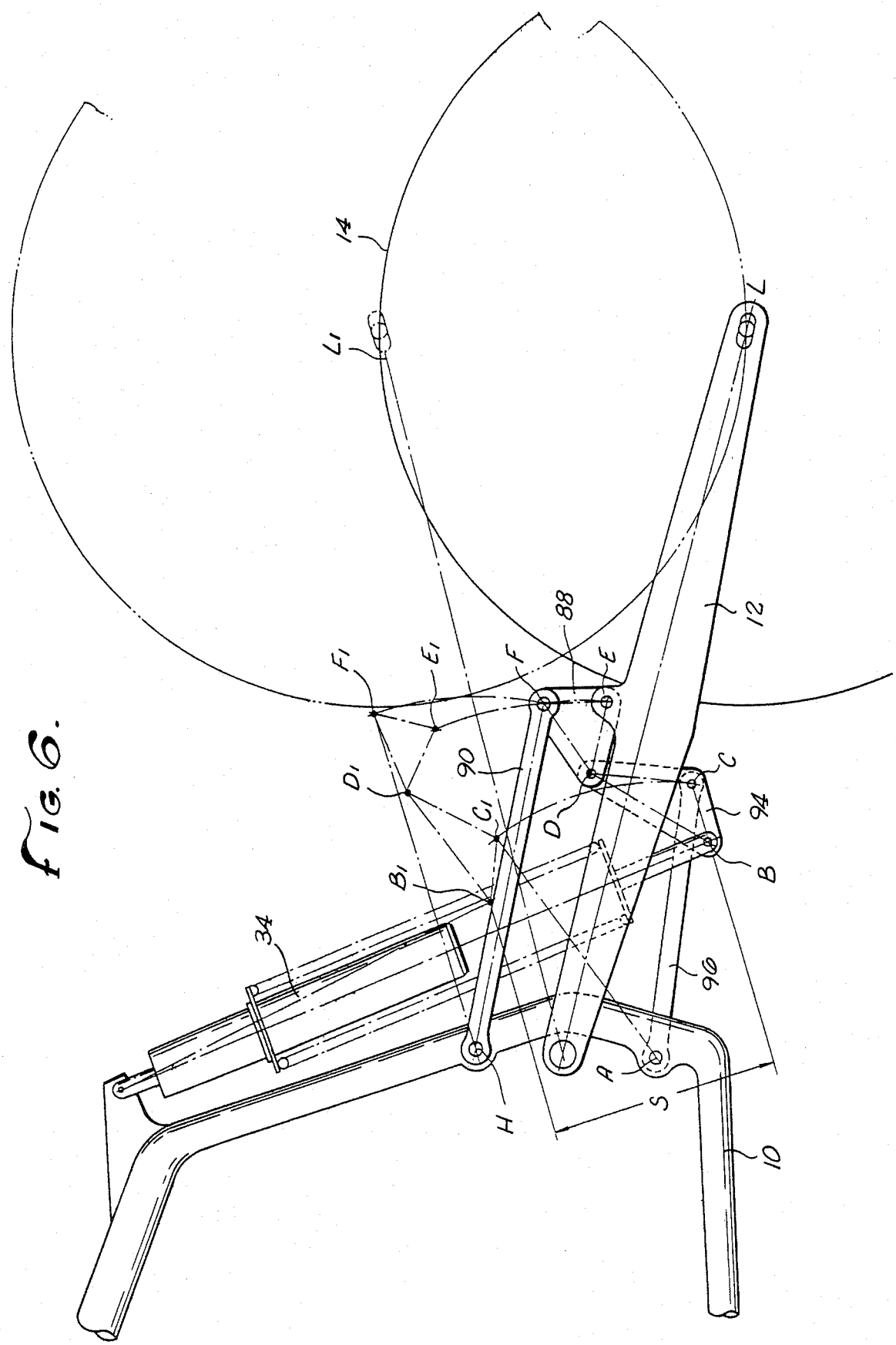
FIG. 6 is a side view of yet another embodiment of the present invention.

FIGS. 6 and 7 illustrate yet another embodiment having certain of the components rearranged but to the same effect as the prior embodiment. The swing arm support linkage is defined by a first arm 88 and rods 90 and 92. The arm 88 is pivotally mounted to the rear wheel support frame 12 while rods 90 and 92 are pivotally mounted to the body frame 10. The cushion linkage includes an arm 94 and a tension rod 96 pivotally connected together. The ends of the cushion linkage are fixed to the swing arm support linkage through pivotal connection between the arms 88 and 94 and to the body frame 10 through pivotal connection with the tension rod 96.

Corresponding transverse axes to those of the first embodiment consistent with recognition of the two portions of the linkage, the swing arm support linkage and the cushion linkage are labeled with corresponding identification. For example, the ends of the swing arm support linkage located at axes E and H of the first embodiment are also found to be located at axes E and H of FIG. 6 with axis E associated with the arm and axis H associated with the rod. Similarly with the cushion linkage, its pivotal coupling with the swing arm support linkage is at axis D. The pivotal connection between components of the cushion linkage is at axis C and the coupling of the cushion linkage to one of the swing arms and the body frame is at axis A.

Similarly to the first embodiment, the stroke is defined between locations B and $B_1$. The swing arm support linkage provide an increasing rate of rise relative to the rear wheel support frame at the pivotal connection D. As will be readily recognized, a substantial stroke and progressive result are achieved by the embodiment of FIGS. 6 and 7 with broadly based linkage elements for better dispersing shock, force loading and moment for both the rear wheel support frame 12 and the body frame 10.

Thus, a linkage system for a rear suspension as defined by several embodiments has been disclosed which provides a substantial stroke to a cushion member, provides highly progressive linkage and provides dispersion of shocks and loads. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A rear suspension for a motorcycle having a body frame, a rear wheel support frame pivotally mounted to the body frame, and a cushion member fixed at a first end to the body frame, comprising
   swing arm support linkage including a first arm and a first rod pivotally connected one to the other, said swing arm support linkage being pivotally connected to the body frame and pivotally connected to the rear wheel support frame;
   cushion linkage including a second arm and a second rod pivotally connected one to the other, said cushion linkage being pivotally connected to said first arm and pivotally connected to one of the body frame and the rear wheel support frame, the cushion member being fixed at a second end of said cushion member to said second arm.

2. The rear wheel suspension of claim 1 wherein said cushion linkage is pivotally connected to the rear wheel support frame.

3. The rear wheel suspension of claim 1 wherein said cushion linkage is pivotally connected to the body frame.

4. The rear wheel suspension of claim 1 wherein there are two said first rods pivotally connected to said first arm, said two first rods being laterally spaced one from another.

5. A rear suspension for a motorcycle having a body frame, a rear wheel support frame pivotally mounted to the body frame, and a cushion member fixed at a first end to the body frame, comprising
   a first arm pivotally connected to the body frame;
   a first rod pivotally connected to said first arm and to the rear wheel support frame;
   a second arm pivotally connected to the rear wheel support frame, the cushion member being fixed at a second end of said cushion member to said second arm; and
   a second rod pivotally connected to said first arm and to said second arm.

6. The rear wheel suspension of claim 5 wherein there are two said first rods pivotally connected to said first arm and to the rear wheel support frame, said two first arms being laterally spaced one from the other.

7. The rear suspension of claim 6 wherein there are two said second rods pivotally connected to said first arm and to said second arm, said two second rods being laterally spaced one from the other.

8. The rear wheel suspension of claim 5 wherein there are two said second arms pivotally connected to the rear wheel support frame, the cushion member being fixed at a second end to both said second arms, said second arms being laterally spaced one from the other.

9. The rear wheel suspension of claim 5 wherein said second arm includes two laterally spaced attachment points the cushion member having a bifurcate second end and being fixed to said two attachment points.

10. A rear suspension for a motorcycle having a body frame, a rear wheel support frame pivotally mounted to the body frame, and a cushion member fixed at a first end to the body frame, comprising
    a first rod pivotally connected to the body frame;
    a first arm pivotally connected to said first rod and to the rear wheel support frame;
    a second rod pivotally connected to the body frame; and
    a second arm pivotally connected to said first arm and to said second rod, the cushion member being fixed at a second end to said second arm.

11. The rear wheel suspension of 10 wherein there are two said first rods pivotally connected to the body frame and pivotally connected to said first arm, said two first rods being laterally spaced one from another.

12. A rear suspension for a motorcycle having a body frame, a rear wheel support frame pivotally mounted to the body frame, and a cushion member fixed at a first end to the body frame, comprising
    swing arm support linkage including a first arm having laterally extending attachment points and two first rods pivotally connected to said first arm at said laterally extending attachment points, being mutually parallel and being laterally displaced one from another, said swing arm support linkage being pivotally mounted to the body frame and being pivotally mounted to the rear wheel support frame; and
    cushion linkage being pivotally connected to said first arm and to one of the body frame and the rear wheel support frame, the cushion member being fixed at a second end to said cushion linkage.

13. The rear wheel suspension of claim 12 wherein said cushion linkage includes a second arm and a second rod pivotally connected one to the other, the second end of the cushion member being attached to said second arm.

* * * * *